(12) United States Patent
Blaine (10) Patent No.: US 9,643,868 B2
(45) Date of Patent: May 9, 2017

(54) METHOD FOR TREATING ANIMAL WASTE (75) Inventor: William Blaine, Philadelphia, PA (US)

(73) Assignee: EnviroKure, Inc., Philadelphia, PA (US)

( * ) Notice: Subject to any disclaimer, the term of this patent is extended or adjusted under 35 U.S.C. 154(b) by 0 days.

(21) Appl. No.: 13/591,995

(22) Filed: Aug. 22, 2012

(65) Prior Publication Data
US 2013/0186155 A1    Jul. 25, 2013

Related U.S. Application Data (60) Provisional application No. 61/526,021, filed on Aug. 22, 2011.

(51) Int. Cl.
*C05F 3/00* (2006.01)
*C02F 11/00* (2006.01)
*C05F 3/06* (2006.01)
*C05F 17/00* (2006.01)
*C02F 9/00* (2006.01)
(Continued)

(52) U.S. Cl.
CPC ............. *C02F 11/004* (2013.01); *A01C 3/00* (2013.01); *B01F 7/00125* (2013.01); *B01F 7/00141* (2013.01); *B01F 7/1665* (2013.01); *B01F 15/00006* (2013.01); *B01F 15/0072* (2013.01); *B01F 15/00454* (2013.01); *B01F 15/00772* (2013.01); *C02F 9/00* (2013.01); *C05F 3/00* (2013.01); *C05F 3/06* (2013.01); *C05F 17/00* (2013.01); *C05F 17/0027* (2013.01); *C05F 17/0045* (2013.01); *C21B 13/008* (2013.01); *C21B 13/0093* (2013.01); *C02F 1/004* (2013.01); *C02F 1/02* (2013.01); *C02F 1/32* (2013.01); *C02F 1/385* (2013.01); *C02F 1/66* (2013.01); *C02F 1/68* (2013.01); *C02F 1/76* (2013.01); *C02F 2103/20* (2013.01); *C02F 2209/006* (2013.01); *C02F 2301/08* (2013.01); *C02F 2303/04* (2013.01); *C02F 2303/24* (2013.01); *C02F 2303/26* (2013.01);
(Continued)

(58) Field of Classification Search
CPC .. C02F 11/004; C02F 9/00; A01C 3/00; B01F 7/00125; B01F 7/00141; B01F 7/1665; B01F 15/00006; B01F 15/00454; B01F 15/0072; B01F 15/00772; C05F 3/00; C05F 3/06; C05F 17/00; C05F 17/0027
USPC ........................................................ 71/15–22
See application file for complete search history.

(56) References Cited

U.S. PATENT DOCUMENTS 3,718,451 A   2/1973   Baumann
3,865,568 A   2/1975   Kratzer ........................... 71/21
(Continued)

FOREIGN PATENT DOCUMENTS

WO   PCT/US2012/51895      8/2012

OTHER PUBLICATIONS

International Preliminary Report on Patentability issued on Feb. 25, 2014 for Intl. Pat. App. No. PCT/US2012/051895 filed Aug. 22, 2012 and published as WO 2013/028776 on Feb. 28, 2013 (Applicant—Envirokure, Incorporated; Inventor—Blaine) (6 pages).

(Continued)

*Primary Examiner* — Jennifer A Smith
(74) *Attorney, Agent, or Firm* — Potter Anderson and Corroon LLP (57) ABSTRACT

Methods and apparatus for the treatment of animal waste are disclosed, together with a treated animal waste and fertilizer and growth media products derived therefrom.

23 Claims, 3 Drawing Sheets

(51) Int. Cl.
*A01C 3/00* (2006.01)
*B01F 7/00* (2006.01)
*B01F 7/16* (2006.01)
*B01F 15/00* (2006.01)
*C21B 13/00* (2006.01)
*C02F 1/00* (2006.01)
*C02F 1/02* (2006.01)
*C02F 1/32* (2006.01)
*C02F 1/38* (2006.01)
*C02F 1/66* (2006.01)
*C02F 1/68* (2006.01)
*C02F 1/76* (2006.01)
*C02F 103/20* (2006.01)

(52) U.S. Cl.
CPC ............ *Y02P 20/145* (2015.11); *Y02W 30/43* (2015.05); *Y02W 30/47* (2015.05)

(56) References Cited

U.S. PATENT DOCUMENTS

| | | | |
|---|---|---|---|
| 3,939,280 A | 2/1976 | Karnemaat | 426/2 |
| 3,966,450 A | 6/1976 | O'Neill et al. | |
| 4,160,656 A | 7/1979 | Junkermann | |
| 4,459,149 A | 7/1984 | Moran et al. | 71/24 |
| 5,174,805 A | 12/1992 | Masuda | 71/29 |
| 5,393,317 A | 2/1995 | Robinson | |
| 5,501,718 A | 3/1996 | Bandurski | 71/9 |
| 5,730,772 A | 3/1998 | Staples | |
| 6,364,926 B1 | 4/2002 | Gryzik et al. | 71/64.1 |
| 6,764,661 B1 | 7/2004 | Girard | 422/305 |
| 7,647,311 B2 | 1/2010 | Tenorio et al. | 707/694 |
| 7,662,205 B2 * | 2/2010 | Burnham | 71/11 |
| 8,409,620 B2 | 4/2013 | Livingston | 424/490 |
| 8,673,046 B1 | 3/2014 | Szogi et al. | |
| 2002/0182710 A1 | 12/2002 | Horn et al. | |
| 2003/0041638 A1 | 3/2003 | Lamour et al. | 71/23 |
| 2004/0031302 A1 | 2/2004 | Eswaran et al. | 71/15 |
| 2004/0040516 A1 | 3/2004 | Jensen | |
| 2004/0065127 A1 | 4/2004 | Connell | 71/15 |
| 2004/0265266 A1 | 12/2004 | Champ et al. | 424/76.21 |
| 2005/0193790 A1 | 9/2005 | Hartman | |
| 2006/0254331 A1 | 11/2006 | Burnham | 71/11 |
| 2009/0188290 A1 | 7/2009 | Marler | 71/21 |
| 2009/0193863 A1 * | 8/2009 | Szogi et al. | 71/21 |
| 2010/0288003 A1 * | 11/2010 | Burnham et al. | 71/12 |
| 2010/0303551 A1 * | 12/2010 | Chang | 405/229 |
| 2011/0079060 A1 | 4/2011 | Hackett et al. | |
| 2011/0303157 A1 | 12/2011 | Laubenstein | 119/442 |
| 2012/0122196 A1 | 5/2012 | Johnson | 435/267 |
| 2013/0019645 A1 | 1/2013 | Crabtree et al. | 71/21 |
| 2013/0186155 A1 * | 7/2013 | Blaine | 71/21 |

OTHER PUBLICATIONS

International Search Report mailed on Oct. 23, 2012 for Intl. Pat. App. No. PCT/US2012/051895 filed Aug. 22, 2012 and published as WO 2013/028776 on Feb. 28, 2013 (Applicant—Envirokure, Incorporated; Inventor—Blaine) (2 pages).

Written Opinion mailed on Oct. 23, 2012 for Intl. Pat. App. No. PCT/US2012/051895 filed Aug. 22, 2012 and published as WO 2013/028776 on Feb. 28, 2013 (Applicant—Envirokure, Incorporated; Inventor—Blaine) (5 pages).

U.S. Appl. No. 61/526,021, filed Aug. 22, 2011, William Blaine.

* cited by examiner

METHOD FOR TREATING ANIMAL WASTE

CROSS-REFERENCE TO RELATED APPLICATIONS

This application claims priority to U.S. Provisional Patent Application Ser. No. 61/526,021, filed on Aug. 22, 2011, which is hereby incorporated by reference in its entirety.

BACKGROUND

Technical Field

The present disclosure relates to methods, systems, and apparatuses for the treatment of animal waste, and to treated animal waste products.

Technical Background

Poultry and other livestock are commonly reared in facilities that are specially designed to manage manure and liquid waste generated by such animals. For example, poultry are typically raised on beds of litter that contain a filler such as wood shavings, wood chips and/or saw dust, spilled food, feathers, and manure. After a growout on the bed of litter and during successive growouts, the litter is predominantly manure, and is eventually replaced with fresh bedding.

In addition to livestock production, farmers raise poultry for the production of eggs. Through industry advances, farmers now raise these animals in cages in buildings reaching as high as six stories. The large amount of manure produced is often accumulated and stored in outdoor holding areas.

Farmers manage the manure and liquid waste from livestock rearing facilities in several ways. For example, many farmers apply the manure and liquid waste onto agricultural fields. Other farmers spread the manure and liquid waste from the facilities directly onto their land.

Manure excreted by poultry and other livestock typically contains a variety of pathogens, including *Salmonella, Coliform, Fecal Coliform, Soil Transmitted Helminths* (hookworm, *Ascaris*, and whipworm), *Campylobacter, Avian Influenza, Histoplasma, Capsulatum Fungus*, and *Escherichia coli*. The presence of these pathogens poses environmental issues and risks to waterways and to the health of farm workers handling the manure. In addition, the use or distribution of manure containing these pathogens on agricultural crops can pose health and environmental concerns to waterways, farm workers, and consumers.

The conventional methods to handle manure and liquid waste products from poultry and livestock production facilities do not address the health and environmental concerns described herein. Thus, there is a need to address methods for efficiently handling and treating manure and liquid waste products from poultry and livestock production facilities. These needs and other needs are satisfied by the methods of the present invention.

SUMMARY

In accordance with the purpose(s) of the invention, as embodied and broadly described herein, this disclosure, in one aspect, relates to methods for the treatment of animal waste, manure and liquids.

In a further aspect, the present disclosure provides a method for treating animal waste, such as, for example, chicken manure, to produce solid and liquid fertilizer.

In another aspect, the present disclosure provides systems and facilities for treating animal waste and/or facilities.

In yet another aspect, the present disclosure provides a mobile system for detoxifying poultry litter and/or manure, and livestock facilities.

In a still further aspect, the present disclosure provides compositions produced by the disclosed methods.

BRIEF DESCRIPTION OF THE FIGURES

The accompanying figures, which are incorporated in and constitute a part of this specification, illustrate several aspects and together with the description serve to explain the principles of the invention.

Additional aspects of the invention will be set forth in part in the description and figures which follow, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

DEFINITIONS

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a solvent" includes mixtures of two or more solvents.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or cannot occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As used herein, "animal waste" or "animal manure solids" refers to manure solids that are present in a composition or an animal waste slurry that contains manure. Solids content refers to the amount of solids present in a composition that remain after water has been removed or allowed to evaporate. In one aspect, "animal waste" can refer to chicken manure, for example, from broilers or pullets. In another aspects, "animal waste" can refer to waste from other animals, such as, for example, hogs, turkey, or other animals not specifically recited herein. In yet another aspect, "animal waste" can refer to a mixture of waste products from two or more types of animals.

Poultry litter refers to the bed of material on which poultry are raised in commercial poultry rearing facilities. The litter can comprise a filler/bedding material such as sawdust or wood shavings and chips, poultry manure, spilled food, and feathers. As the same bed of litter is often used in successive growouts of poultry, the specific composition of the poultry litter varies over time with the addition of manure to the litter, the addition of bedding or amendments between growouts, and efforts to clean the litter between growouts and after egg-laying operations. In a further aspect, a poultry litter can comprise litter and manure accumulated by egg laying facilities.

Manure slurry refers to a mixture of manure and any liquid, e.g., urine and/or water. Thus, in one aspect, a manure slurry can be formed when animal manure and urine are contacted, or when manure is mixed with water from an external source. No specific moisture and/or solids content is intended to be implied by the term slurry.

The methods of this invention are effective for treating any animal waste, and especially poultry litter and livestock manures. In one aspect, the animal waste can be present as a liquid slurry. In another aspect, the animal waste can be present as a dry or substantially dry material, as a liquid, as a slurry, or any combination thereof. In a further aspect, the present methods are effective for treating a nutrient-rich animal manure that can be useful for producing fertilizer. Non-limiting examples of animals commonly reared in such operations include sheep, swine, poultry, goats, cattle, dairy cows, broilers, pullets, ducks, geese, and rabbits. In a still further aspect, the invention is especially applicable to poultry rearing, egg-laying, swine rearing, and dairy cow rearing operations.

As briefly described above, the present disclosure relates to methods for treating manure and waste products from poultry and livestock production facilities. In one aspect, the methods of the present invention comprise contacting animal waste products with a treatment composition. In another aspect, the waste product comprises poultry manure and contaminated bedding materials. In still another aspect, the methods described herein can at least partially detoxify chicken feces or a composition comprising chicken feces. In yet another aspect, the methods can utilize organic materials and can produce a nutrient rich organic product that can be useful as fertilizer. In one aspect, the methods and apparatus described herein can be used as a stationary system, for example, wherein animal waste materials can be transported from the rearing or growth facility. In another aspect, the methods and apparatus described herein can be used as a mobile system, for example, that can be temporarily located at a rearing or growth facility to treat animal waste, and then can subsequently be moved to another location. In other aspects, the methods described herein or any portion thereof can be performed in a continuous, semi-continuous, or batch process.

Animal Waste

As briefly described above, the methods of the present invention can utilize and/or treat animal waste products from a variety of animals, such as, for example, poultry. In one aspect, the animal waste stream to be treated can comprise poultry litter. In other aspects, the waste stream can comprise animal waste, feces, urine, food, bedding materials such as wood chips and/or sawdust, feathers, and other materials. In another aspect, the poultry litter can contain one or more harmful microorganisms, such as bacteria, viruses, protozoa, and/or other parasites or pathogens. As used herein, the term poultry litter is intended to refer to an animal bedding containing feces.

Animal waste can be provided from an on-site facility or can be delivered, for example, in bulk quantities by truck. It should also be understood that the content of a given animal waste product can vary depending upon, for example, the type of animal and/or rearing or growth facility, length of time the animal waste has been stored, environmental conditions, etc. For example, poultry litter animal waste can contain woodchips, sawdust, feathers, and/or other materials in addition to feces, and the moisture content can vary depending upon whether the litter originated in a broiler facility, a pullet facility, or egg-laying facility. Poultry litter can comprises a variety of materials of varying size.

Treatment Method

In various aspects, the disclosed methods can convert animal manure, through a series processes, into a solid and/or a liquid fertilizer. In a further aspect, fertilizer produced by the disclosed methods can meet the requirements for organic fertilizer. In a yet further aspect, the disclosed methods can be used for many types of animal waste. In a specific aspect, the disclosed methods are particularly useful for all chicken manure, including dry manure and liquids, for example, from broiler facilities, pullet facilities, and egg-laying chicken facilities, respectively. As described above, animal waste can be utilized from an on-site facility or can be provided in bulk, for example, by truck or a conveyor system.

It should be understood that the treatment methods described herein can comprise multiple individual steps, and that unless recited otherwise, the steps can be performed in any order. It should also be understood that multiple individual steps can be combined into a single step, and that certain steps are optional, depending upon, for example, the animal waste product to be treated and the desired properties of the resulting product.

The pH of an animal waste product can vary, depending upon the type of animal, storage and/or environmental conditions, other materials present in the waste, or other factors. In various aspects, an animal waste product, for example, a poultry litter, can have a pH of from about 7.8 to about 8.8. In one aspect, the pH of an animal waste can be adjusted, for example, to a neutral and/or slightly acidic value. In one aspect, the pH of an animal waste product or a slurry containing animal waste can be measured to determine what, if any, adjustment is needed. In another aspect, the pH can be adjusted to a value more acidic than needed to obtain an initial desirable pH, but such that the pH can be maintained at desirable levels upon storage and/or treatment to prevent the formation of ammonia. One of skill in the art could readily determine the pH of an animal waste product and determine the degree of adjustment to be made. While not wishing to be bound by theory, it is believed that such an adjustment can neutralize any basic compounds present in the animal waste and prevent the formation and/or release of ammonia from nitrogen compounds present in the waste. In one aspect, the pH can be adjusted to a value of from about 2.3 to about 7, for example, about 2.3, 2.5, 3, 3.5, 4, 4.5, 5, 5.5, 6, 6.5, or 7; or from about 3.5 to about 7, for example, about 3.5, 4, 4.5, 5, 5.5, 6, 6.5, or 7. In one aspect, the pH can be adjusted to a value of from about 6 to about 7, for example, about 6, 6.2, 6.2, 6.3, 6.4, 6.5, 6.6, 6.7, 6.8, 6.9, or 7. In another aspect, the pH can be adjusted to a value of from about 6.5 to about 7, for example, about 6.5, 6.6, 6.7, 6.8, 6.9, or 7. It should be understood that the pH can be less than 6 or greater than 7, and the inventive methods are not intended to be limited to any particular pH value. In another aspect, an animal waste having a pH less than about 6 or greater than about 7 can be treated as described herein. In yet another aspect, an animal waste having a pH of from about 6 to about 7 can be treated as described herein, and can maintain all or substantially all of the nitrogen and/or other nutrients present in the waste as delivered and minimize and/or prevent the loss of nitrogen from the formation and release of ammonia.

In another aspect, if an animal waste product, as delivered, has a pH of from about 6 to about 7, a reduced or no adjustment may be needed.

A pH adjustment, if needed, can be performed using any suitable pH adjusting agent. In one aspect, any acidic compound can be applied and/or contacted with all or a portion of the animal waste product. In another aspect, an acid can be contacted with all or a portion of the animal waste product. Exemplary acids that can be utilized to adjust the pH of an animal waste can comprise citric acid, acetic acid, phosphoric acid, carbonic acid, hydrochloric acid, nitric acid, sulfuric acid, or a combination thereof. In a specific aspect, citric acid can be used. In another aspect, an acid derived from natural sources can be used. In yet another aspect, an acid that can be classified as an organic product can be used. Any pH adjusting agent, such as, for example, an acid, can be contacted as a solid or a liquid. In one aspect, a solution, for example, an aqueous solution of citric acid can be contacted with an animal waste product. In another aspect, a solid, for example, citric acid powder, can be contacted with an animal waste product. Any suitable form and/or concentration of a pH adjusting agent can be utilized, and one of skill in the art could readily determine an appropriate pH adjusting agent, concentration, and method of delivery for a particular animal waste product.

The animal waste product, either prior to, during, or subsequent to any pH adjustment, if needed, can optionally be moved, for example, conveyed, to a tank or vessel for subsequent processing.

In one aspect, a predetermined amount of animal waste product can be disposed in a tank or vessel. In another aspect, prior to, during, or subsequent to placing animal waste in such a tank or vessel, the moisture content of the animal waste can optionally be measured. If measured, the moisture content can be determined by conventional means available to one of skill in the art. It should be understood that the moisture content of an animal waste product can vary, depending upon type and age of animal, together with storage and environmental conditions. In one aspect, an animal waste product can be provided having a moisture content of from about 10% to about 90% or higher, by weight, for example, about 10, 12, 14, 16, 18, 20, 25, 30, 35, 40, 45, 50, 55, 60, 65, 70, 75, 80, 85, or 90%. In another aspect, an animal waste product can be provided having a moisture content of from about 40 wt. % to about 80 wt. %, or from about 40 wt. % to about 90 wt. %. In various aspects, the moisture content can be adjusted to a level of at least about 75%, by weight, for example, about 75%, 77%, 79%, 81%, 83%, 85%, 87%, 89%, or higher. In other aspects, the moisture content can be adjusted to a level of at least about 80%, by weight, for example, at least about 80%, 82%, 84%, 86%, 88%, 90%, 92%, 94%, 96%, or higher. For example, the moisture content can be adjusted such that 100 g of adjusted material comprises about 20 g of manure and other materials and about 80 g water.

In one aspect, the moisture content can be adjusted, if needed, using water and/or a nutrient enriched liquid. In one aspect, use of a nutrient enriched liquid can minimize and/or eliminate dilution of one or more desirable nutrients that can be present in the animal waste. Exemplary nutrients can include those compounds beneficial for fertilizer or agricultural applications, such as, nitrogen, phosphorus, and potassium. In one aspect, a nutrient enriched liquid can be water derived from the treatment methods described herein, for example, water that has been in contact with animal waste. In another aspect, a nutrient enriched liquid can be separately prepared using animal waste or desirable chemical compounds. In one aspect, the nutrient enriched liquid is prepared from water contacted with animal waste and does not introduce non-organic components into the treatment process. The proportions of nutrient enriched liquid and water, for example, clean or municipal water, used in the treatment process can vary, depending upon the particular animal waste product being treated and/or the desired properties of the resulting treated product, and one of skill in the art could readily determine an appropriate proportion of nutrient enriched liquid and water to be used. In various aspects, the proportion can range from 100% water to 100% nutrient enriched liquid, and the present invention is intended to include all combinations there between.

Once a desired moisture or liquid level has been obtained, for example, via addition of water and/or nutrient enriched liquid, the resulting aqueous mixture can be allowed to remain in contact for a period of time to facilitate the breakdown of manure particles. In one aspect, the aqueous mixture can be allowed to stand for a period of time without mixing. In another aspect, the aqueous mixture can be mixed, for example, via stirring, shaking, or other suitable means, for a period of time. In one aspect, such a contact or mixing period of time can range from about 30 minutes to about 5 hours, for example, about 0.5 hours, 0.75 hours, 1 hour, 1.25 hours, 1.5 hours, 1.75 hours, 2 hours, 2.5 hours, 3 hours, 3.5 hours, 4 hours, or 5 hours, although the aqueous mixture can also be used immediately or after a period of time greater than 5 hours. In one aspect, the aqueous mixture is allowed to remain in contact for about an hour. In another aspect, the aqueous mixture is mixed for about an hour.

The aqueous mixture can optionally be subjected to an initial grinding step to reduce the particle size of all or some of the particles in the animal waste product. In one aspect, the aqueous mixture can be ground, for example, using an Arde Barinco grinding pump. In another aspect, any suitable method for reducing the particle size of all or a portion of the aqueous mixture can be utilized. In another aspect, all or a portion of the aqueous mixture can be ground to a size from about 100 μm to about 200 μm, for example, about 100, 110, 120, 130, 140, 150, 160, 170, 180, 190, or 200 μm; or from about 125 μm to about 175 μm, for example, about 125, 130, 135, 140, 145, 150, 155, 160, 165, 170, or 175 μm. In another aspect, all or a portion of the aqueous mixture can be ground to a size of about 149 μm, equivalent to a 100 mesh screen.

In one aspect, all or a portion of an animal waste, such as poultry litter, can be ground or otherwise processed so as to have a substantially similar particle size. In another aspect, multiple grinding or processing steps can be utilized to ultimately reach a desired particle size. In a further aspect, the animal waste can be treated without the need for grinding or further processing. In one aspect, the animal waste, such as poultry litter, can have an average particle size of less than about ½ inch, for example, about 10, 9, 8, 7 6, 5, 4, 3, 2, or 1 mm. In a further aspect, the average size can be less than about 1 mm, for example 100, 90, 80, 70, 60, 50, 40, 30, 20, or even 10 μm. In a specific embodiment, poultry litter from broilers can be first ground to a particle size of about ¼ inch, and then subsequently ground to a particle size of about 1 to 1.5 mm.

While grinding a poultry litter sample is not necessary, such grinding or processing steps can be, in various aspects, advantageous. In one aspect, small particle sizes can improve the handling and movement of the litter during the treatment process. In another aspect, grinding to a small particle size can provide a higher surface area and thus, increase the portion of the litter that contacts the treatment composition. In such an aspect, pathogens that are occluded within wood chips or other materials in the litter are more likely to contact the treatment composition and be rendered harmless.

The animal waste can also be subjected to an optional separation step to remove foreign objects, stones, feathers, or other materials unsuitable for use in subsequent processing steps and/or in a resulting product. In one aspect, the animal waste can be disposed in a shake tank, for example, after adding any needed water and/or nutrient enriched liquid. A shake tank or other suitable means can separate all or a portion of heavy objects such as stones and light objects such as feathers from the manure portion of the animal waste. In one aspect, stones can be present in feed and the resulting litter for poultry and other fowl. Such stones, if allowed to remain in the animal waste product, do not necessarily provide nutrient value to a resulting product and can damage processing equipment. In one aspect, all or a portion of stones can be removed from the animal waste product. Similarly, the presence of feathers can interfere with processing steps and can be separated from the manure portion of the waste. In one aspect, at least a portion of the feathers present in an animal waste material can be removed, dried, and ground, such that they can be introduced into the process or combined with other solids during or after the process. It should be understood that the examples described herein include poultry litter and can contain stones and feathers. Animal waste products from other animals or facilities can contain other undesirable heavy or light objects or no foreign objects at all, and the methods of the present invention can be adjusted to include or not include such a separation step as deemed appropriate.

The animal waste, for example, as an aqueous mixture, can be subjected to such a separation step, for example, a shake tank, for a period of time needed to remove all or a portion of heavy and light objects. In one aspect, the animal waste can be subjected to a shake tank from about 10 minutes to about 2 hours, for example, about 10, 20, 30, 40, 50, 60, 70, 80, 90, 100, 110, or 120 minutes; or from about 10 minutes to about 30 minutes, for example, about 10, 15, 20, 25, or 30 minutes; or about 20 minutes.

The separated animal waste, containing no or a reduced number of, for example, stones and feathers, can be subjected to a further step to at least partially separate solid and liquid components. In one aspect, a filtration system can be used to remove at least a portion of the water or liquid components from solids. In one aspect, such liquid components can contain nutrients derived from the animal waste. In another aspect, a centrifuge can be utilized to separate solid and/or suspended particulate matter from the liquid. All or a portion of the separated liquid can be recycled as a nutrient enriched liquid to be used in other steps of the treatment process. In still other aspects, other separation technologies can be employed, and the present invention is not intended to be limited to any particular separation techniques described herein.

The resulting separated liquid can optionally be subjected to further processing steps to reduce the size of and/or remove any remaining solid or particulate matter. Such solid and/or particulate matter can be problematic if the liquid is ultimately sprayed as a fertilizer. In one aspect, the separated liquid can be subjected to a grinding step to reduce the particle size of any remaining particulate matter. In yet another aspect, the separated liquid can be subjected to a filtration step to remove particulate matter. In various aspects, the degree of filtration and/or separation can vary depending upon the intended application. In various aspects, a filtration medium having opening of from about 50 μm to about 100 μm, for example, about 50, 60, 70, 80, 90, or 100 μm; or from about 60 μm to about 80 μm, for example, 50, 55, 60, 65, 70, 75, or 80 μm can be used. In one aspect, a 200 mesh filtration medium having openings of about 74 μm can be used. In other aspects, the filtration medium can have smaller or larger openings, and one of skill in the art could readily select an appropriate filtration or separation technique. Any solids or particulate matter separated in such a technique can be disposed of or combined with the solids previously separated for use, for example, as a fertilizer product.

Separated solid components can optionally be allowed to age for a period of time. In one aspect, such an aging step can allow for the breakdown or further reduction in particle size of the solid components. The period of time, if any, for which a solid component is allowed to age can vary from about 2 to about 200 hours, for example, about 2, 4, 6, 8, 10, 12, 14, 18, 20, 24, 28, 32, 40, 48, 72, 100, 125, 150, 175, or 200 hours; or from about 24 to about 72 hours, for example, about 24, 26, 28, 30, 32, 34, 36, 38, 40, 42, 44, 46, 48, 50, 52, 54, 56, 58, 60, 62, 64, 66, 68, 70, or 72 hours. In other aspects, an aging step, if performed, can be less than 2 or greater than 200 hours, and one of skill in the art could readily determine an appropriate aging step. Similarly, separated liquid components can optionally be allowed to age for a period of time. In one aspect, the period of time, if any, for which a liquid component is allowed to age can comprise any values or ranges recited herein with respect to the aging of a solid component. In another aspect, the period of time, if any, for which a liquid component is allowed to age can be less than or greater than any value specifically recited herein. In various aspects, the period of time, if any, for which a liquid component is allowed to age can be the same as or different than a period of time for which a solid component is allowed to age.

All or any portion of the animal waste, for example, separate solid and/or liquid components, can optionally be subjected to a sterilization step to remove and/or kill all or a portion of pathogens that can be present in the animal waste. It should understand that the specific pathogens that can be present can vary depending upon the animal and originating facility, along with the handling history of the animal waste. A sterilization step, if performed, can utilize any suitable means for removing and/or killing pathogens. In one aspect, the sterilization step comprises heating the waste at a temperature and for a period of time sufficient to kill all or a portion of the pathogens present therein. In another aspect, the sterilization step comprises exposing the waste to ultraviolet radiation for a period of time sufficient to kill all or a portion of the pathogens present therein. In another aspect, the sterilization step comprises contacting the waste with a chemical agent, such as, for example, chlorine dioxide, for a period of time sufficient to kill all or a portion of pathogens present therein. In other aspects, a sterilization step can comprise other techniques or a combination of two or more techniques recited herein or known in the art to kill pathogens. A chemical agent, if utilized, can comprise any agent suitable for reducing or killing pathogens. In one aspect, a chlorine based agent can be used. In another aspect, a solution comprising chlorine dioxide can be used. In yet another aspect, a material, such as sodium hypochlorite, can be used. A chemical agent, if used, can comprise a solid and/or a liquid and can have any concentration suitable for killing pathogens in an animal waste product. In one aspect, a solid component can be subjected to any one or more of the sterilization techniques described herein. In another aspect, a liquid component can be subjected to any one or more of the sterilization techniques described herein. In one aspect, a dry component can be composted for a period of time sufficient to eliminate or kill all or a portion of the pathogens present therein.

In one aspect, a chemical agent can be used in an amount effective to provide a treated waste product having at least one improved environmental, health and/or animal performance property as compared to a waste product that is not treated with the treatment composition. In another aspect, such a chemical agent, if used, can comprise an aqueous solution of chlorine dioxide. The concentration of such an aqueous solution of chlorine dioxide can be any level suitable for use in treating a given waste stream. In various aspects, the treatment composition can comprise from about 20 ppm to about 5,000 ppm, for example, about 20, 30, 40, 50, 100, 150, 200, 250, 300, 350, 400, 450, 500, 550, 600, 650, 700, 750, 800, 850, 900, 950, 1,000, 1,500, 2,000, 2,500, 3,000, 3,500, 4,000, 4,500 or 5,000 ppm chlorine dioxide. In other aspects, the chemical agent can comprise less than about 100 ppm or greater than about 1,000 ppm chlorine dioxide, and the present invention is not intended to be limited to any particular chlorine dioxide concentration. In yet another aspect, the treatment composition comprises an aqueous solution having about 500 ppm chlorine dioxide. In still other aspects, no chemical agent is utilized and other sterilization techniques, such as heating, can be used.

An aqueous solution of chlorine dioxide, if used, can be prepared in any manner suitable for use in a given treatment process. In one aspect, the chlorine dioxide solution should be prepared prior to use, for example, within a few hours. As chlorine dioxide can breakdown and/or dissipate over time and upon exposure to sunlight, the effective concentration of chlorine dioxide in the solution can decrease over time. In another aspect, the chlorine dioxide can be stored such that exposure to sunlight is limited or eliminated.

The chlorine dioxide, if used, can be generated in any manner suitable for use in a given treatment process. In one aspect, the chlorine dioxide is generated through the addition of sodium chlorite, for example, Versan® D100. The sodium chlorite can then generate chlorine dioxide through moisture or water activation. In a further aspect, the chlorine dioxide can be delivered through a controlled-release device to address different performance requirements. In a still further aspect, the device can have a long or short chlorine dioxide generation time. In a yet further aspect, the device can have high or low chlorine dioxide conversion.

In one aspect, the chlorine dioxide can be generated through the addition of sodium hypochlorite solution, for example Versan® 260. In a further aspect, the chlorine dioxide solution can then be delivered by fast or slow release to meet different application requirements. In a still further aspect, the chlorine dioxide solution can be delivered as a slow drip into the feces solution.

In one aspect, chlorine dioxide, for example, crystalline chlorine dioxide, if used, can be added to water. In another aspect, crystalline chlorine dioxide can be added in a controlled manner to prevent rapid evolution and/or dissipation of the chlorine dioxide or byproducts thereof. In one aspect, the chlorine dioxide can be placed in a porous container, such as, for example, a bag, pouch, or sachet, that can subsequently be placed in water and facilitate the controlled release of the chlorine dioxide. In such an aspect, the container can be chemically resistant to chlorine dioxide and/or any other materials that can be present. In a specific example, crystalline chlorine dioxide can be placed in a Tyvek® bag or pouch that can be disposed in water. In another aspect, the chlorine dioxide solution can be prepared in accordance with the compositions and methods described in U.S. Pat. No. 6,764,661, which is hereby incorporated by reference for the purpose of teaching devices and methods for producing aqueous chlorine dioxide solutions.

In one aspect, an animal waste product, for example, comprising feces, wood chips, sawdust, or other absorbent cellulosic and/or non-cellulosic material, can optionally be subjected to a preliminary sterilization treatment, prior to a sterilization step, for example, prior to grinding and separation. If such a preliminary sterilization step is performed, it can comprise any suitable sterilization method to reduce of kill at least a portion of the pathogens present. Such a preliminary sterilization step can be performed via a pre-soak of the animal waste product, wherein the waste is contacted with a chemical agent, such as chlorine dioxide, for a period of time. Such a pre-soak preliminary sterilization step can soak and/or soften the waste product to provide for more efficient sterilization in a subsequent step. In one aspect, the treatment process can be described as organic and no chlorine dioxide based pre-soak or sterilization step is performed. In another aspect, an agent, such as chlorine dioxide, can be used.

If performed, an aqueous chlorine dioxide can be supplied in a ratio of from about 2 to 1 (chlorine dioxide to waste product), but can also utilize other ratios as deemed appropriate for the treatment of a given waste material. The length of a preliminary sterilization step, if performed, can also vary, for example, up to about 24 hours. If a pre-soak is performed, the mixture of waste product and aqueous chlorine dioxide solution can optionally be released to a macerator system, and additional aqueous chlorine dioxide solution can be added to the waste mixture. In a yet further aspect, mixing can promote contact between the particles and the chlorine dioxide to facilitate further destruction of the undesired organisms which may have survived any pre-soak treatment. In a still further aspect, allowing the waste mixture to remain in the tank after grinding has the advantage of facilitating particle break down below 1 mm. In an even further aspect, a particular advantage resulting from the grinding stages is the ensuing small size of the particulate, for example, less than about 5 μm, which exposes large surface areas of the solid matter to the chlorine dioxide, leaving no "pockets" within the waste material within which the undesired organisms or other harmful entities may escape destruction.

With reference to the figures, various exemplary aspects of the treatment methods described herein are detailed below. In one aspect, operation of the method is described with reference to the schematic diagram depicting the treatment process shown in FIG. 1. In a further aspect, the manure or waste is delivered in bulk 1, generally by a tractor-trailer, dump truck, conveyor truck or the like. The bulk waste product 1 then travels on a conveyor belt 2 to a storage area 4. En route to the storage area 4, the bulk waste product is sprayed with an acid, such as citric acid 3, through, for example, a sprinkling system 3A. From the storage area 4, the waste product is moved by skid steer machine 5 to the hopper 6 of the screw conveyor 7. Here, the screw conveyor 7 fills the mixing tank 8 with a predetermined amount of waste product. The waste product moisture content is analyzed and a corresponding amount of a liquid additive 9 is added to adjust the moisture content to reach a user-determined value. The moisture adjustment step can also take place at various stages in the process, for example when the bulk waste is delivered. A nutrient enriched liquid 11 is added to the mixing tank 8 to reduce the waste product to a liquid mixture form. The liquid waste product is mixed for a sufficient time, for example approximately an hour, to further break down the manure particles.

Figure 1:
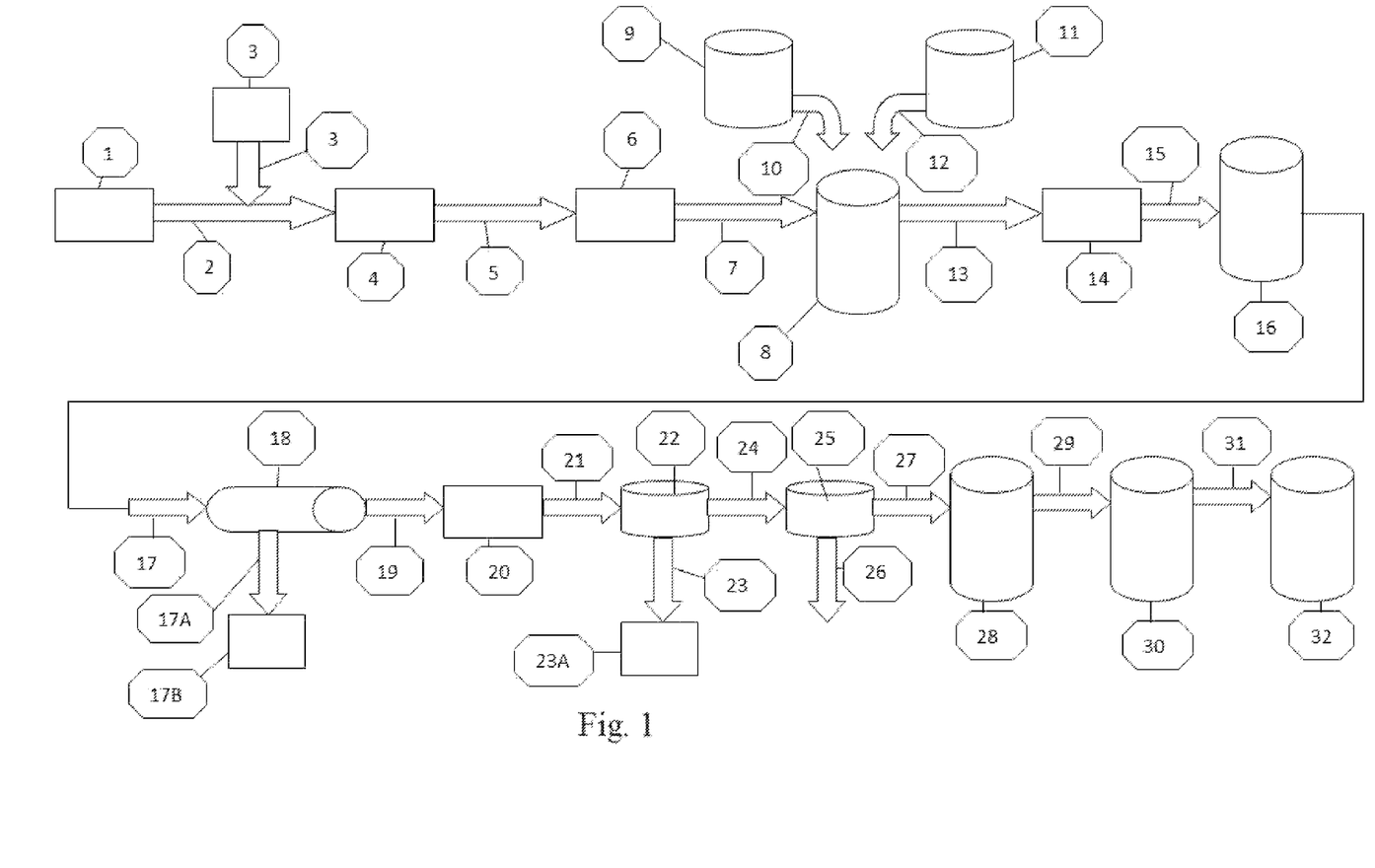
FIG. 1 is a schematic of an exemplary process and apparatus for treating animal waste, in accordance with various aspects of the present invention.

From the mixing tank 8 the waste product is transported by pump 13 to a grinder pump 14 for further particle size reduction. The product is then transported by pump 15 to a shake tank 16 to separate the heavy objects from lighter objects. The product then remains in the shake tank 16 for about 20 minutes. Next, a pump system 17 moves the product to a centrifuge 18 where the product is separated into solid and liquid phases. The solid product is moved by conveyor belt 17A to a bulk storage area 17B. The liquid product is pumped 19 to a second grinder pump 20 for further particle size reduction. From the grinder pump 20, the product is pumped 21 to a filter system 22 where the product can be separated by particle size. For example, large particles unsuitable for spraying as fertilizer can be removed and deposited in bulk storage 23A. Acceptable product that can be sprayed is pumped 24 to a second filter system 25 to remove the process liquid. The removed process liquid is pumped 26 back to the storage tank 11. The end product is pumped 27 to a storage tank 28 where it ages to allow further reduction in particle size, from 24 to 72 hours. The aged product is then moved to a pathogen elimination tank 30 for treatment necessary to meet requirements for organic fertilizer. The treated product is then ready to ship and is pumped 31 into transport containers 32.

As it may be apparent, the volume of the different tanks can, in various aspects, be tailored to the requirements of a particular installation. In one aspect, practical sizes in the range of about 10,000 gallons are feasible. In a further aspect, the different tanks can be constructed of any suitable material for a particular installation. In a still further aspect, the tank can be constructed of polypropylene, although other materials, such as stainless steel are also contemplated.

If an optional preliminary sterilization step (i.e., a pre-soak) is performed, the mixture of waste product and aqueous chlorine dioxide solution can be released to a macerator system comprising a hopper 6, a first grinder-pump 14 and a second grinder pump 20 once the pre-soak is complete. In an example embodiment, hopper 6 is a 1,000 gallon conical stainless steel hopper. Additional aqueous chlorine dioxide solution may be added to the waste mixture while in hopper 6. The grinder-pump 14 is fed waste mixture from the hopper 6 through a feed line with a sufficient diameter to support adequate flow rates, such as about 3 inches to about 8 inches in diameter, for example, about 6 inches. Two stages of grinding are shown in this example, with a first stage executed by grinder-pump 14 reducing the solids in the waste mixture to a maximum of about ¼ inch in size, and the second stage executed by the first grinder-pump 20, which grinds the solids to a maximum particulate size of about 1 mm. Fewer or more grinding stages are also feasible, depending on the nature of the animal waste. Grinder-pumps and grinders usable with the treatment system are commercially available.

In such an aspect, the mixture can be pumped, after grinding, to a mixing tank 8 where aqueous chlorine dioxide solution can again be added. In one aspect, about 70 grams of crystalline chlorine dioxide can be used for every 15 gallons of finished poultry liquid.

In various aspects, the disclosed methods use one or more mixing stages. In one aspect, mixing can take place in any disclosed tank, for example in the mixing tank 8. In a further aspect, a mechanical mixer can be used for mixing. The mixer can be any commercially available mixer or a custom configured mixing system. In one aspect, an exemplary embodiment of a mixing system is described with reference to the schematic diagram shown in FIGS. 2 and 3. The mixing system comprises a steel base 41, molded plastic mixing tank 42 and blade drive assembly 43. The blade drive assembly 43 is located and secured to the top of the frame and is removable to allow cleaning and maintenance of the mixing system. The tank 42 is located in the base 41 and is also removable to allow for cleaning and maintenance.

Figure 2:
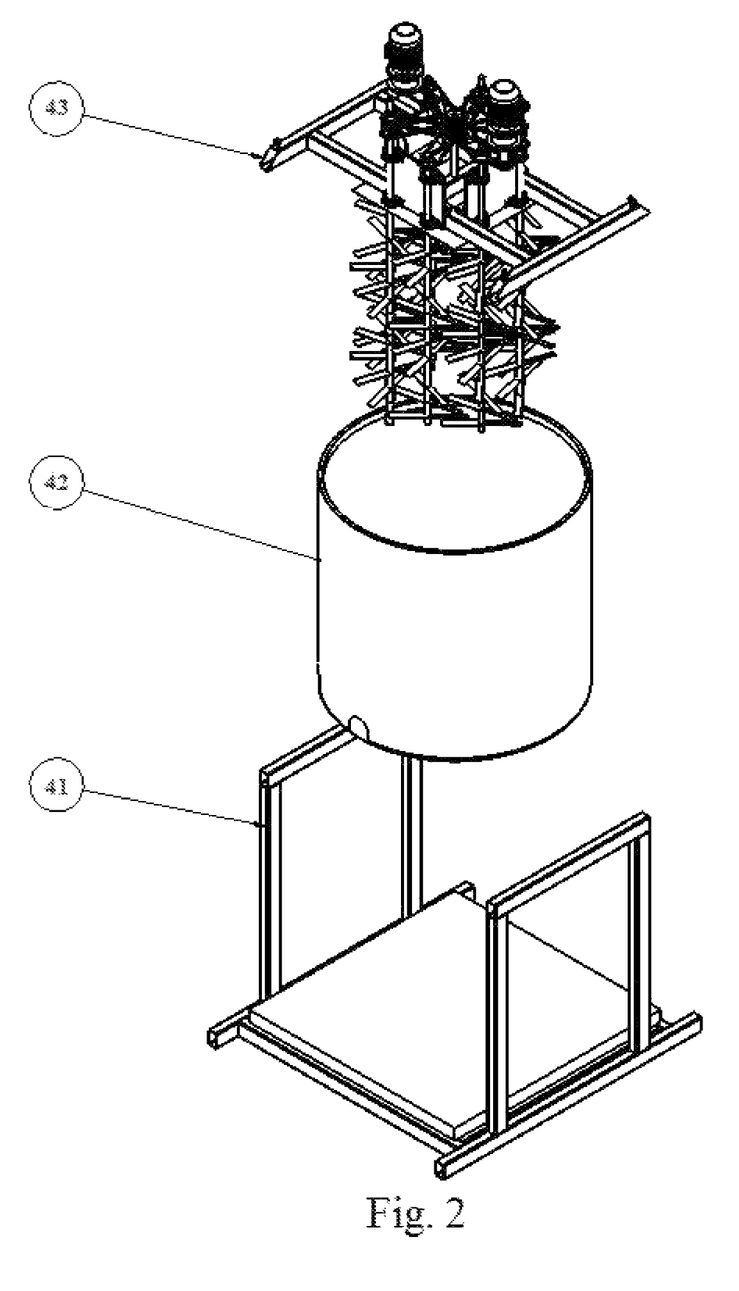
FIG. 2 is a schematic of an exemplary mixing system used in the disclosed process and apparatus for treating animal waste, in accordance with various aspects of the present invention.
Figure 3:
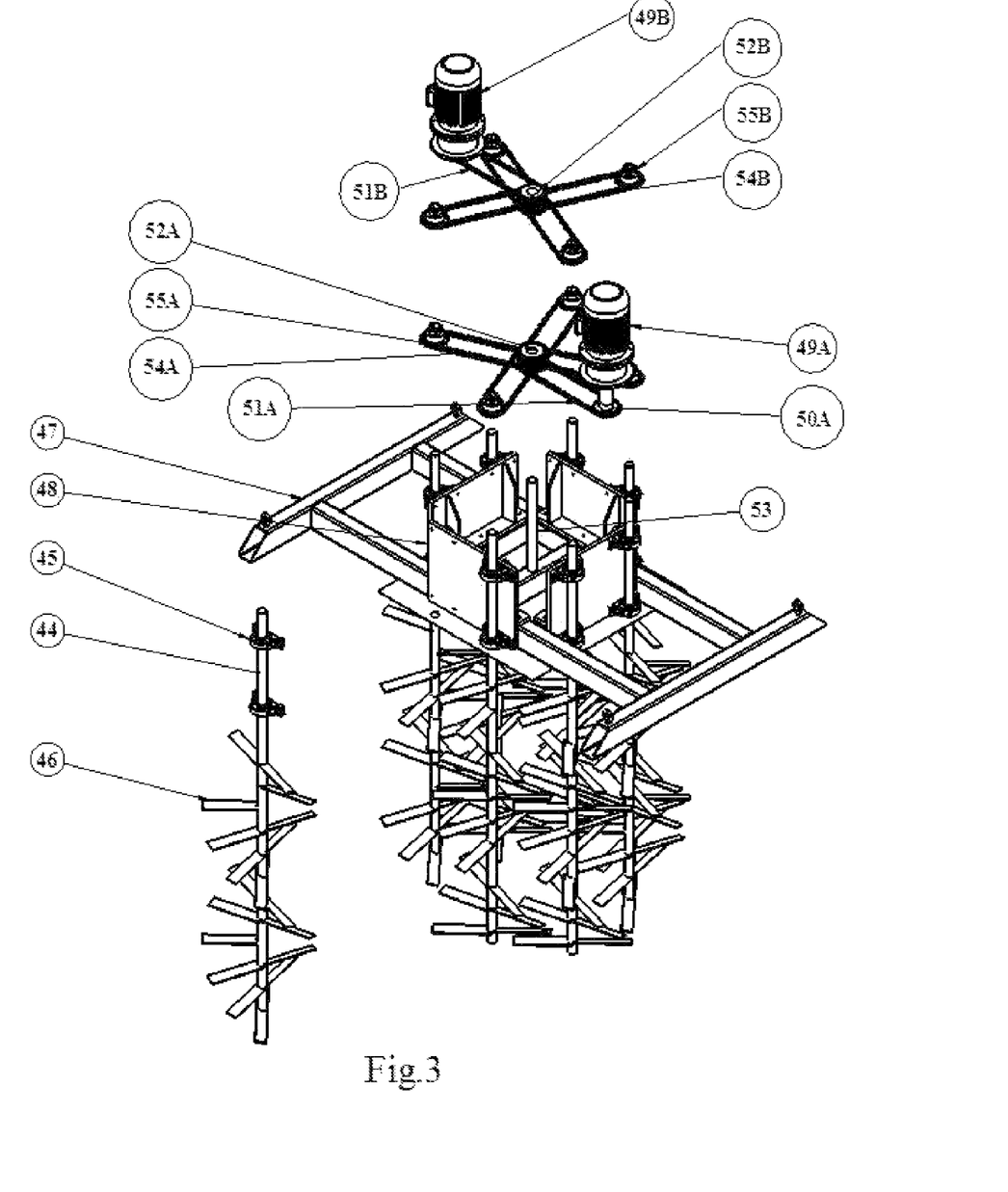
FIG. 3 is a schematic of an exemplary mixing system used in the disclosed process and apparatus for treating animal waste, in accordance with various aspects of the present invention.

In a further aspect, the blade drive assembly 43 comprises multiple blades, for example eight mixer blades in this embodiment, and their associated drive mechanism. The mixer blades comprise a main shaft 44, mixer arms 46 and support bearings 45. Multiple mixer arms are arrayed about and secured to the main shaft. In a specific aspect, the mixer arms can be in a staggered pattern both vertically and radially to allow for thorough mixing and oriented with an angular tilt to induce vertical movement of the material during mixing. The mixer blades are located onto support plates 48 and are configured in an equally spaced pattern about the center of the tank. The support plates mount to the drive support 47. In one aspect, the drive input to the eight mixing blades can be split into multiple groups, for example two groups in this embodiment. In such an aspect, group A would comprise the odd numbered blades, and group B would comprise the even numbered blades. In a further aspect, each group can have an independent drive. In a still further aspect, the drive can comprise an AC motor with appropriate integral gear reducer 49 to which a motor drive pulley 50 is attached. Using a drive chain 51 the motor drives a center drive pulley 52 that is supported by the center idler shaft 53. Thus in one aspect, the center drive pulley is a multi-strand pulley from which four individual blade drive chains 54 emanate. These chains in turn drive the mixer shaft pulley 55 which is connected to the mixer blade main shaft.

In one aspect, configuring the drive input in with multiple independent motors allows for varying the speed and/or direction of the adjacent mixer blades in relationship to each other, allowing for optimization of the mixing process. In a further aspect, the motors could be set to run in opposite directions which would result in the blades counter-rotating in relationship to each other. In a still further aspect, the motors could be set to different speeds to modify the flow of material around the mixing bowl.

In one aspect, the pathogen elimination tank 30 is motorized, which allows continual mixing of the waste mixture with a chlorine dioxide pack at various levels of the waste mixture to allow maximum exposure of chlorine dioxide to pathogens. This widespread chlorine dioxide release and distribution from the pack into the waste mixture augments contact between the particles and the chlorine dioxide to facilitate further destruction of pathogens. In a further aspect, the volume rate is about one pack (70 grams) for every 15 gallons treated.

In another aspect, mixing tank 8 is about 5,000 gallons in volume in this example, but other sizes are of course feasible. In a still further aspect, the mixing tank 8 has motorized agitator panels which agitate the mixture, at this stage comprising solid matter smaller than or equal to 1 mm in size suspended in the aqueous chlorine dioxide, along with feces and other liquid components. In a yet further aspect, mixing of the mixture promotes contact between the particles and the chlorine dioxide to facilitate further destruction of the undesired organisms which may have survived any pre-soak treatment. In a still further aspect, allowing the waste mixture to remain in the tank after grinding has the advantage of facilitating particle break down below 1 mm. In an even further aspect, a particular advantage resulting from the grinding stages is the ensuing small size of the particulate, for example, less than about 5 μm, which exposes large surface areas of the solid matter to the chlorine dioxide, leaving no "pockets" within the waste material within which the undesired organisms or other harmful entities may escape destruction.

In a further aspect, mixing can optionally be accomplished in two stages, for example, there can be a second mixing tank to which the waste mixture is pumped by another grinder-pump providing fluid communication between the tanks 8 and 16. In a still further aspect, tank 16 can also be about 5,000 gallons in volume with motorized mixing vanes to agitate the mixture. Commercially available mixing tanks could be used in this example. In a further aspect, the effectiveness of the mixing in the pathogen elimination is enhanced by feeding the waste mixture back to tank 8 using a sludge pump. In a still further aspect, additional aqueous chlorine dioxide solution is added to tank 8 in cooperation with the feed-back stream to maintain the chlorine dioxide concentration at the desired level for effective elimination of the undesired organisms. The feed-back loop is maintained so that the average time in the mixing stage for a unit of the mixture is adequate to ensure destruction of the undesired organisms.

In a further aspect, the waste mixture can be pumped from the second mixing tank by another sludge pump to a separator device, in this example a centrifuge 18. Centrifuge 18 separates the waste mixture into a solid, bulk product 17B and a liquid product. The solid fertilizer is in the form of a paste. A water content of about 10% (about 90% dewatered) can be advantageous. The solid fertilizer is conducted by a conveyor 17A to a holding tank 17 where it is stored until it is sold for use in agriculture. The stream of liquid fertilizer passes through a sterilizer for a final sterilization phase, in this example passing through a twenty foot pipe which is heated to 190° F. The liquid stream, now comprising a safe liquid fertilizer, is stored in a holding tank 32 from which it may be distributed for use in agriculture.

The apparatus shown in FIG. 1 can be scaled up or down over a wide range of sizes, capacities and flow rates to meet particular demands and requirements. Encompassed within the invention are stationary plants of relatively large capacity and through-put, to which animal waste products from many different livestock feed operations may be transported, as well as smaller capacity mobile units, wherein the apparatus shown in FIG. 1, or one similar to it, is mounted to a means for transport, such as a trailer. Mobile units can be brought to a particular feed operation to treat the animal waste in-situ, using water available on site.

In various aspects, mobile units utilizing the disclosed methods can convert animal manure, through a series processes, into solid and liquid fertilizer. In a further aspect, the mobile units can be configured identically to a stationary plant. In a yet further aspect, the mobile units can be used for many types of animal manure. In a specific aspect, the mobile units can be particularly useful for treating chicken manure, including dry (broiler) manure and liquid (egg-layer) manure. In one aspect, the mobile unit comprises a chlorine dioxide solution preparation tank, two mixing tanks, and a centrifugal separator. A pump located within the preparation tank mixes water with dry chemicals as disclosed in U.S. Pat. No. 6,764,661 to Girard and hereby incorporated by reference, and circulates the resulting aqueous chlorine dioxide solution within the tank, preparing the solution to the desired concentration. In a still further aspect, another pump can deliver the aqueous chlorine dioxide solution from to a first mixing tank through a conduit where it is mixed with the bulk animal waste to form a mixture. In a yet further aspect, the waste mixture is mixed in the first mixing tank by rotary vanes rotated by an electric motor. A grinder-pump can then move the mixture from the first mixing tank to a second mixing tank, while grinding the solids in the mixture to a desired size. In a further aspect, additional chlorine dioxide solution from the preparation tank can be continually added to the second mixing tank as necessary to maintain an effective concentration for the pathogen destruction. In a still further aspect, rotating vanes agitate the mixture within the second mixing tank, while another grinder-pump grinds and re-circulates the mixture to the second mixing tank through a conduit. After a sufficient time has passed to enable the destruction of enough of the undesired organisms, grinder-pump can then be used to pump the mixture to a centrifugal separator where the mixture is separated into liquid and solid fertilizer streams. In a further aspect, a generator can supply power to some or all of the pumps and parts of the mobile unit. In a still further aspect, onsite electrical power can be used in the alternative to power some or all of the pumps and parts of the mobile unit. Similarly, in one aspect water for the operation can be carried to the site in the preparation tank. In a further aspect, a local water supply at the site of the operation can be used. In one aspect, the various components, the tanks, pumps, generator and centrifuge can be mounted on a trailer for ease of transport of the treatment apparatus. Such systems can however, utilize any means for apparatus transport to the treatment site. In various aspects, the treatment apparatus will have a control system, regardless of whether they are mobile or stationary. In one aspect, the control system comprises a microprocessor-based programmable logic controller which receives information, such as chemical concentrations, flow rates, pressures, and temperatures from various sensors and transducers operatively associated with the system and uses this information to control the various pumps, valves and other components to effect system operation in accordance with algorithms specified in resident software in the controller.

In a various aspects, the disclosed methods can comprise a closed system for treating animal waste, wherein a pre-soak step is not performed. The closed system is advantageous because it is expected that it can mitigate nitrogen loss in the process, for example, from dilution or upon contact (e.g., volatilization and/or cavitation). In such an aspect, the closed process is unlike the processes described above wherein the chlorine dioxide is added in the beginning and can cause excess water to enter into the process and lead to dilution of the final product. In contrast, the disclosed systems, in one aspect, can start with loading bulk animal waste directly into a hopper. The bulk waste in the hopper can then optionally be mixed (recycled) with previously extracted liquid fertilizer from a separating step downstream in the process and described herein. This liquid fertilizer, already high in nutrients, can prevent dilution from occurring. In a further aspect, the hopper can then be closed and sealed. In a still further aspect, the bulk waste and feces is softened by the recycled liquid and then sent through the macerator, which can include a particulate grinder, a grinder pump and another particulate grinder. Since chicken feces are comprised of about 70% moisture, it breaks down readily with the assistance of the recycled liquid to create a sludge. The sludge can then be sent to a holding tank, which may, for example, be a 5,000 gallon polypropylene tank. The sludge can then be treated in holding tank with chlorine dioxide. In one aspect, the sludge can be treated with chlorine dioxide using a slow stirring process. In a further aspect, the chlorine dioxide release and distribution mechanisms can be controlled to address different performance requirements. In a still further aspect, one Versan® can be used for every 10 gals of sludge. Once treated with chlorine dioxide, the sludge can be pumped by a sludge pump to a centrifuge for separation into a solid component and a liquid component, wherein the solid and liquid components can be directed to separate storage tanks, while optionally passing through a means of sterilization, for example UV or heat treatment. Note that, in one aspect, a portion of the liquid component can be held in a tank for recycling into the hopper, while another portion of the liquid can go into the holding tank. In a further aspect, the mixing tank can be, for example, about 5,000 gallons in capacity, and the holding tank can be, for example, about 10,000 gallons.

Treated Waste

In one aspect, each of the resulting treated solid and liquid streams can be useful in agricultural applications. In one aspect, the treated solid or liquid waste does not comprise any harmful organisms. In another aspect, the treated solid or liquid does not exhibit an ammonia odor typically associated with animal feces. In still another aspect, the treated solid or liquid does not contain significant amounts of ammonia.

In a further aspect, the methods described herein utilize pH lowering agent consistently in the inventive system, thereby resulting in a lower pH balance throughout the treatment process. In one aspect, the pH lowering agent is citric acid. In still further aspect, the pH range of the treated waste is substantially reduced. In a yet further aspect, the lowered pH allows controlling the loss of ammonia. In a still further aspect, the lowered pH can minimize odor.

In another aspect, the methods described herein do not result in the loss of nitrogen and/or phosphorus in the waste stream. The resulting treated liquids can be useful as, for example, a fertilizer spray or additive into other products. Similarly, the treated solids can be spread onto fields or crops, for example, as a growth media, or can be incorporated into other agricultural compositions. In a further aspect, the resulting products of the present invention can be useful in lawn and garden markets. In still further aspect, the products can be used in turf management applications. In a yet further aspect, products produced by the disclosed methods can be retail packaged for use by consumers. In an even further aspect, the products can be used in professional activities, for example, in horticulture-related activities.

It should be understood that the methods and devices described herein are intended to be exemplary, and the present invention is not intended to be limited to any particular steps or components. Accordingly, any individual steps, devices, or combinations thereof can be present or not present in various aspects of the invention. For example, the methods and devices of the present disclosure can lack one or more components, but are still intended to be covered by this disclosure.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification be considered as exemplary only, with a true scope and spirit of the invention being indicated by the following claims.

What is claimed is:

1. A method for producing a liquid fertilizer from animal waste, the method comprising:
   a) adjusting moisture content and pH of the animal waste to produce an animal waste slurry comprising between about 40 wt % and about 95 wt % moisture and a pH between about 6 and about 7;
   b) allowing components of the animal waste slurry to remain in contact for between about 30 minutes and about 5 hours;
   c) reducing particle size of solids in the animal waste slurry;
   d) separating the animal waste slurry into a substantially liquid component and a substantially solid component; and
   e) subjecting the substantially liquid component to one or more processing steps comprising (1) aging the substantially liquid component to facilitate breakdown of solids remaining in the substantially liquid component (2) removing part or all of solids remaining in the substantially liquid component, and/or (3) reducing particle size of solids remaining in the substantially liquid component, thereby producing the liquid fertilizer;
   wherein steps a) through e) are conducted within a pH range of about 6 to about 7.

2. The method of claim 1, wherein the animal waste comprises poultry litter.

3. The method of claim 2, wherein the animal waste comprises manure from a broiler, a pullet, an egg-laying facility, a chicken rearing facility, or any combination thereof.

4. The method of claim 1, wherein the moisture content of the animal waste slurry is at least about 70 wt % moisture.

5. The method of claim 1, wherein the moisture content of the animal waste slurry is at least about 80 wt % moisture.

6. The method of claim 1, wherein the moisture of the animal waste is adjusted at least in part by the addition of a nutrient-enriched liquid.

7. The method of claim 6, wherein the nutrient-enriched liquid is selected from liquid animal waste and/or the substantially liquid component separated from the animal waste slurry.

8. The method of claim 1, wherein the pH of the animal waste slurry is between about 6.5 and about 7.

9. The method of claim 1, wherein the pH of the animal waste is adjusted by the addition of an acid.

10. The method of claim 9, wherein the acid is selected from acetic acid, citric acid, phosphoric acid, nitric acid, hydrochloric acid, sulfuric acid, or any combination thereof.

11. The method of claim 1, wherein the allowing components of the animal waste slurry to remain in contact comprises mixing the components for between about 30 minutes and about 5 hours.

12. The method of claim 1, wherein the reducing the particle size of solids in the animal waste slurry comprises grinding, milling, shearing, or a combination thereof.

13. The method of claim 1, wherein the particle size of solids in the animal waste slurry is reduced to an average size of about 149 micrometers or less.

14. The method of claim 1, wherein the step of separating the animal waste slurry into a substantially liquid component and a substantially solid component comprises centrifugation, screening, pressing, filtration or a combination thereof.

15. The method of claim 1, wherein the further processing of the substantially liquid component comprises aging the substantially liquid component for between about 2 hours and about 200 hours.

16. The method of claim 1, wherein the further processing of the substantially liquid component comprises removing part or all of any solids remaining in the substantially liquid component by one or more filtrations.

17. The method of claim 15, wherein the one or more filtrations produces a filtrate having particles of an average size less than about 100 micrometers.

18. The method of claim 1, comprising an additional step of removing heavy and/or light objects from the animal waste slurry prior to reducing the particle size of solids in the slurry.

19. The method of claim 1, comprising an additional step of removing or killing pathogens present in the animal waste.

20. The method of claim 19, wherein the pathogens are removed or killed by heat, ultraviolet irradiation, chemical agents, or any combination thereof.

21. The method of claim 20, wherein the chemical agent comprises chlorine dioxide or a precursor thereof.

22. The method of claim 1, wherein at least one step of the method is performed at a location where the animal waste is produced.

23. The method of claim 1, wherein at least one step of the method is performed on a mobile unit.

* * * * *